US009511343B2

(12) United States Patent
Little et al.

(10) Patent No.: US 9,511,343 B2
(45) Date of Patent: Dec. 6, 2016

(54) METHODS AND APPARATUS TO CONTROL REACTION RATES OF CHEMICAL REACTIONS BY APPLYING A MAGNETIC FIELD

(75) Inventors: Reginald B. Little, Washington, DC (US); James W. Mitchell, Washington, DC (US)

(73) Assignee: Howard University, Washington, DC (US)

( * ) Notice: Subject to any disclaimer, the term of this patent is extended or adjusted under 35 U.S.C. 154(b) by 0 days.

(21) Appl. No.: 14/006,080

(22) PCT Filed: Mar. 22, 2012

(86) PCT No.: PCT/US2012/030141
§ 371 (c)(1),
(2), (4) Date: Feb. 3, 2014

(87) PCT Pub. No.: WO2012/134954
PCT Pub. Date: Oct. 4, 2012

(65) Prior Publication Data
US 2014/0147369 A1 May 29, 2014

Related U.S. Application Data (60) Provisional application No. 61/467,708, filed on Mar. 25, 2011.

(51) Int. Cl.
*B01J 19/08* (2006.01)
*C01B 31/04* (2006.01)
*B82Y 30/00* (2011.01)
*B82Y 40/00* (2011.01)

(52) U.S. Cl.
CPC ............. *B01J 19/087* (2013.01); *B82Y 30/00* (2013.01); *B82Y 40/00* (2013.01); *C01B 31/043* (2013.01); *C01B 31/0484* (2013.01); *B01J 2219/089* (2013.01); *B01J 2219/0892* (2013.01)

(58) Field of Classification Search
CPC ............... B01J 19/087; B01J 2219/089; B01J 2219/0892; B82Y 40/00; B82Y 30/00; C01B 31/0484; C01B 31/043
USPC . 423/415.1; 204/157.47, 157.68; 422/186.01
See application file for complete search history.

(56) References Cited

U.S. PATENT DOCUMENTS

| RE31,186 E | 3/1983 | Rosensweig |
| 2002/0192141 A1 | 12/2002 | Little |
| 2004/0115232 A1 | 6/2004 | Giroud et al. |
| 2005/0202185 A1 | 9/2005 | Greengard et al. |
| 2006/0233703 A1 | 10/2006 | Little |
| 2009/0143221 A1 | 6/2009 | Ogunwumi et al. |
| 2009/0311167 A1 | 12/2009 | Height et al. |
| 2010/0303706 A1 | 12/2010 | Wallace et al. |

FOREIGN PATENT DOCUMENTS

| WO | 01/49409 A1 | 7/2001 |
| WO | 2010/099275 A1 | 9/2010 |
| WO | 2010/099395 A1 | 9/2010 |

OTHER PUBLICATIONS

PCT International Search Report and Written Opinion of the International Searching Authority dated Jun. 22, 2012 for International Application PCT/US2012/030141, 9 pages.
Pei-yan Lin et al., Effects of Magnetic Field on Catalytic Activity of CO Oxidation and O2 Adsorption over LnO.7Sr0.3Mn03, The Journal of Physical Chemistry, vol. 97, No. 8, Feb. 25, 1993, 3 pages.
PCT International Preliminary Report on Patentability (Chapter I of the Patent Cooperation Treaty) dated Oct. 1, 2013 from the International Bureau of WIPO for International Application PCT/US2012/030141, 7 pages.

*Primary Examiner* — Daniel C McCracken
(74) *Attorney, Agent, or Firm* — Fitch, Even, Tabin & Flannery, LLP (57) ABSTRACT

Methods and apparatus to control reaction rates of chemical reactions. Methods can include mixing chemical reactants to provide a reaction mixture, at least one chemical reactant being magnetic; and applying a magnetic field to the reaction mixture, the magnetic field being applied to effect a control of the rate of a chemical reaction between the reactants in the reaction mixture, the magnetic field being effective to change the reaction rate over a chemical reaction between the same reactants at the same pressure and temperature where the reaction mixture is not exposed to the magnetic field.

34 Claims, 7 Drawing Sheets

METHODS AND APPARATUS TO CONTROL REACTION RATES OF CHEMICAL REACTIONS BY APPLYING A MAGNETIC FIELD

RELATED APPLICATIONS

This application is a U.S. national phase application filed under 35 U.S.C. §371 of International Application PCT/US2012/030141, filed 22 Mar. 2012, designating the United States, which claims the benefit of U.S. Provisional Patent Application No. 61/467,708, filed 25 Mar. 2011, the contents of which are fully incorporated herein by this reference.

FIELD

Methods and apparatus to control reaction rates of chemical reactions, and specifically methods and apparatus to control reaction rates of chemical reactions by applying a magnetic field.

BACKGROUND

The chemistry and biochemistry of carbonaceous and hydrocarbon substances in reaction with oxygen are of fundamental importance to living organisms, chemistry, physics, biology, engineering, industry, and other terrestrial phenomena. These oxidative-reductive reactions are the basis for the energy currency in a multitude of systems in the geosphere and biosphere. The understanding, control, suppression and/or enhancement of the chemical kinetics, dynamics, catalysis, and enzymatic reactions of such energetic reductive/oxidative reactions are enormously crucial, especially with the booming population, increasingly higher energy demands, energy scarcity and desired conservation of resources, and environmental delicacy and protection.

Improvements in the control and conversion efficiency of chemical energetics to other forms of energy (mechanical, electrical, optical, and thermal) are accordingly desired.

SUMMARY

Provided herein are embodiments to modulate oxidative-reductive reactions, and specifically methods and systems to accelerate and/or decelerate graphite/graphene oxidative-reductive reactions using magnetic induction with optional thermal activation.

In one approach a method of promoting and selecting a chemical reaction is provided having the steps of admixing chemical precursors, wherein at least one chemical precursor or its intermediate is magnetic (e.g., a para-magnetic or ferro-magnetic magnetic precursor); and applying a supplemental magnetic field to the chemical precursors, wherein the chemical reaction is promoted. The initial reaction temperature can be in the range of about 25° to 1000° Celsius, though in one approach a range of about 25° to about 75° Celsius is provided. In one approach, the at least one chemical precursor can be selected from the group of graphite, graphene, coal, diamond, cellulose, proteins, various combinations thereof, and the like.

In another approach, the at least one chemical precursor or its intermediate can contain carbon, wherein during the step of applying the supplemental magnetic field, the carbon undergoes a dynamic transition to become magnetic. In one embodiment, the carbon undergoes a dynamic transition to become ferromagnetic.

In some embodiments, the supplemental magnetic field is in the range of up to about 50 Tesla (T). in other embodiments, the supplemental magnetic field is about 0.5 T. The supplemental magnetic field can constant during the reaction. In some embodiments, the applied magnetic field can vary over time in the range of about 0 to 500 seconds and also vary in space in the range of about 0 to 1 micron.

In one approach, the promoted chemical reaction can occur in an oxygenated environment in the range of about 1 to 80 percent. In another embodiment, the promoted chemical reaction can occur in a pressure range of about $10^{-9}$ to $10^8$ atm.

In one approach, the method can also include the step of admixing an additional magnetic alloy catalyst. The additional magnetic alloy catalyst can be selected from the group of iron, cobalt, neodymium, nickel, combinations thereof, and the like. In one approach the additional magnetic alloy catalyst can be in the range of about 1 to 40 percent weight of the total reactants.

In one approach, the chemical reaction can be configured for the oxidation of graphite to graphene oxide. In another approach, the chemical reaction can be configured for the nitration of graphene. In yet another approach, the chemical reaction can be configured for the combustion of coal. In still another approach, the chemical reaction can be configured to functionalize graphene for propellants.

In another approach, the chemical reaction can further add the step of adding reagents selected from the group of perchlorates, borates, chromates, oxides, cobaltates, nickelates, vandates, various combinations thereof, and the like.

In some embodiments, the promoted chemical reaction can occur in an anaerobic environment. In one approach this can include anaerobic environment that includes Argon gas.

Another approach provides a composition formed by a method of promoting a chemical reaction having the steps of admixing chemical precursors, wherein at least one chemical precursor or its intermediate contains carbon; and applying a magnetic field to the chemical precursors, wherein the chemical reaction is promoted.

In another approach, a method of controlling a reaction rate of a chemical reaction is provided having the steps of mixing chemical reactants to provide a reaction mixture, at least one chemical reactant being magnetic; and applying a magnetic field to the reaction mixture, the magnetic field being applied to effect a control of the rate of a chemical reaction between the reactants in the reaction mixture, the magnetic field being effective to change the reaction rate over a chemical reaction between the same reactants at the same pressure and temperature where the reaction mixture is not exposed to the magnetic field. In this approach, the reaction mixture can have an initial reaction temperature in the range of about 25° to 1000° Celsius, or in some embodiments an initial reaction temperature in a range of about 25° to about 75° Celsius. In this approach, at least one chemical reactant can be selected from the group of graphite, graphene, coal, diamond, cellulose, proteins, combinations thereof, and the like. In other embodiments, one of the reactants can be sulfuric add, $NaNO_3$, $KMnO_4$ and mixtures thereof. In this approach, the magnetic field can in the range of from about 0.5 to about 50 Tesla and in other embodiments, the magnetic field can be in the range of from about 0.5 to about 50 Tesla. In some embodiments the reaction rate can be increased or decreased with the reaction being exposed to the magnetic field.

In another approach, an apparatus is configured to effect a chemical reaction during which the reaction is exposed to a magnetic field, the apparatus having a chamber configured to blend chemical reactants and react the chemical reactants, at least one first chemical reactant selected from the group consisting of graphite, graphene, coal, diamond, cellulose, proteins, and combinations thereof and at least one second reactant selected from the group consisting of sulfuric acid, $NaNO_3$, $KMnO_4$ and mixtures thereof: and a magnetic field source device effective to expose the first and second reactants to a magnetic field magnetic field within the chamber, the magnetic field source device effective for providing a magnetic field in the range of from about 0.5 to about 50 Tesla. In one embodiment, the chamber can be effective for containing reactions which have a temperature in the range of about 25° to 1000° Celsius.

In yet another embodiment, method of increasing a reaction rate of a chemical reaction is provided, the method having the steps of mixing chemical reactants to provide a reaction mixture, at least one chemical reactant being magnetic; and applying a magnetic field to the reaction mixture, the magnetic field being applied to effect an increase of the rate of a chemical reaction between the reactants in the reaction mixture, the magnetic field being effective to change the reaction rate by at least 14 percent over a chemical reaction between the same reactants at the same pressure and temperature after the same time period of reaction where the reaction mixture is not exposed to the magnetic field.

Other features will become more apparent to persons having ordinary skill in the art to which pertains from the following description and claims.

BRIEF DESCRIPTION OF THE FIGURES

The foregoing features, as well as other features, will become apparent with reference to the description and figures below in which.

DETAILED DESCRIPTION

Oxidation-reduction reactions in particular combustion chemistry play an important role in the biosphere and geosphere. A greater understanding and control of such chemistry is desirable and beneficial to mankind. In this art, methods of magnetic and thermal activation are disclosed to modulate oxidation reduction reactions so as to improve conversion, efficiency of energy transformations and rates of such reactions. A new chemistry of relativistic electron transfer is introduced. The new magnetic induction and control of oxidation reduction are demonstrated for the Hummer Method of graphite oxidation by potassium permanganate, sodium nitrate and sulfuric acid.

Recently, the role and importance of magnetism during chemical reactions have been disclosed. The lower density of states of second series elements and many 3d transition metal elements are noted to cause greater magnetic contributions to the chemical dynamics of these elements. The embodiments described herein provide systems and methods of the application of magnetism as it relates to chemical oxidation-reduction of carbonaceous substances and the accelerative, the power output, and the selective chemistry of such carbonaceous reactions. The embodiments provide improvements in rates of oxidative-reductive reactions and the operating temperatures for higher energy conversions of such chemical energies to work. The effect of the present embodiments can be shown in reactions using solid and liquid phase reactants. Accordingly, the methods and compositions can improve the efficiency of chemical energy conversions by modulating operating temperatures and rates of oxidative-reductive reactions.

In the present embodiments, ferromagnetism in carbon can be by way of example harnessed to accelerate, decelerate and control energetic and product distribution of such chemical reactions. The internal, inherent magnetic properties of other reactants and oxidants that contain second series and 3d elements of the periodic table can also be harnessed to control the oxidative reductive chemistry. Illustrative reactions of this type are described herein to demonstrate the presented methods and system embodiments. The use of magnetization with optional thermal activation for organizing, synchronizing, selecting, decelerating, accelerating and orchestrating chemical reactions can provide several energy saving applications by raising the energy conversion efficiency and power conversion in engines and power plants.

The present embodiments can be demonstrated and realized using the recent discovery of graphene (one-atom-thick planar sheets of $sp^2$-bonded carbon atoms densely packed in a honeycomb crystal lattice) and the unique Dirac electronic symmetry of graphene-graphite. These embodiments can allow new uses of magnetization for control of chemical kinetics, dynamics and catalysis for chemically altering Dirac electronic symmetry and for thereby implementing a new relativistic chemistry. Generally, induced magnetism can be used to exploit the Dirac symmetry for new chemical kinetics. As reactions occur, the magnetic field can organize and compress the reactants, intermediates and products in space-time. Reactions can occur in magnetic and nonmagnetic environments, but the external magnetic field can slow the reaction rate so that as temperature rises more conversions simultaneously can occur at times with more powerful and accelerated release of energy. Accordingly, the externally induced magnetic field may control such energy releases to raise furnace temperature for better efficient energy conversion to work.

In the art, engines and generators can operate by oxidation of carbon, hydrocarbons and other carbonaceous substances by thermal conditions for activating the reactions. At higher temperatures, carbon sources are provided with activation energy for breaking bonds of the reactants for subsequent new bond formations and for forming the products: e.g., $CO_2$ and $H_2O$. The exothermicity of oxidative reductive reactions provides subsequent energy to sustain activation of the combustion. Nevertheless, while the high activation temperatures initiate some reactions, in the absence of an induced-external ("external") magnetic field, the higher temperatures can also push reactants apart to expand the reacting media and the subsequent exothermicity further pushes reactants and intermediates apart to diminish combustion yield and instantaneous power. Without external magnetization, such effects of high temperature of activation can diminish the synchronization and organization of the combustion reactions and reduce the power released by the combustion for lowering the power output of the reactions. Without external magnetization, the created intermediates do manifest internal magnetism during the oxidative-reductive chemistry of carbonaceous substances. The strength of such internal magnetism depends on the type reactants, the magnitude of the activation and the extent of bond cleavage such that the greater activation and greater bond cleavage create more highly magnetic atomic intermediates with greater magnetic attraction between those intermediates. For given reactants and activation energy, an external magnetic field can polarize the intermediates in space-time for enhancing the magnetization with synchronization and organization of the product formation and power release.

For the present embodiments, an induced external magnetic field is provided to oppose the subsonic thermal expansion of reactants and intermediates during combustion reactions. The external magnetic field can orient reactants more rapidly relative to the stoichastic orientation in zero applied magnetic field. The external magnetic field can induce organized and synchronized rotations of the reactants relative to the stoichastic, random and chaotic motions in zero applied magnetic field. As reactants form intermediates, the magnetic field can better hold paramagnetic reactants and paramagnetic intermediates together at a given temperature relative to the stoichastic dispersion of the reactants and intermediates in zero applied magnetic field. Even at higher temperatures as encountered in combustion processes, the external magnetic field can compress reactants and intermediates for more organized, synchronized oxidative reductive reactions relative to oxidation-reduction reaction with no applied magnetic field.

Potential applications for the present embodiments can include, for example: device fabrication of graphene based nano-electronics in magnetic field; acceleration of oxidation of carbonaceous materials, such as coal, for higher efficiency of coal burning power plants in magnetic field; shifting in equilibrium operating conditions of water gas shift reaction on graphene or graphite in magnetic field - Example:

Graphene+CO+$H_2O \leftrightarrow H_2$+$CO_2$+Graphene;

magnetic controlled absorption, storage and release of hydrogen in graphene, graphite and CNT materials; and magnetically controlled enhanced intercalation in graphite or graphene electrode batteries for more efficiency and more power. Thus, the concept of magnetic field induced and accelerated chemical reactions of graphite and graphene has broad general applications for the enhancement of efficiency of chemical reaction and energetics.

In some embodiments, methods and systems are provided for magnetic acceleration, deceleration, control and shift in chemical reaction kinetics and dynamics of graphite/graphene and $H_2SO_4$ in strong oxidants (e.g., $KMnO_4$, $NaNO_3$, any powdered or solid carbonaceous materials in a direct reaction with $O_2$) involving that of faster oxidative reductive kinetics to accelerated reaction and shift in dynamics for nitration and sulfonation of graphene. Magnetic field organization of the intermediates ($KMnO_4$, $NaNO_3$ and $H_2SO_4$) can form aromatic polyoxoanionic complexes ($Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$) of these oxidative species for their magnetically driven orientations for accelerated aromatic multi-electron transfer (Dirac Chemistry) reactions with graphite-graphene reductants. The existence of such novel polyoxoanionic complexes on graphene is supported by recent observed disproportionation chemistry on graphene. The recently observed formations of proton and hydroxyl clusters on graphene with novel magnetic properties give more proof of such. Thus, novel magnetic organized aromatic polyoxoanionic complexes of $Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$ on graphene are possible. The magnetizations and protonations of these oxidative, anionic complexes can contribute more thermodynamics stability and kinetic lability to these polyoxoanionic complexes ($Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$). The present embodiments can provide magnetic field induced aromatic symmetry into such polyoxoanions of $Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$ for similar Dirac electron symmetry as in pi ($\pi$) aromatic electrons in graphene with the consequent synchronization of multiple, fused, oxidizing, aromatic-like oxidative polyoxoanionic-complexes for reducing, aromatic graphene thereby for faster Dirac aromatic graphene oxidative reductive chemistry. Even without an externally applied magnetic field, already internal magnetism develops during such oxidative-reductive reactions between such oxidative polyoxoanionic complexes and graphite graphene reductants. External magnetic field can augment the internal magnetic organization and orchestration of these reactions. The magnetic field can thus induce a new type of chemical reaction: Dirac chemical kinetics and dynamics.

The magnetic induction of such novel Dirac chemical kinetics and dynamics results from the magnetic field organizing aromatic structures in the $Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$ polyoxoanionic. In the absence of an external magnetic field, there is some internal magnetism between the graphite and the $KMnO_4$, $NaNO_3$, and $H_2SO_4$ oxidants that organizes these reactants. The external magnetic field also enhances the organization of protons of the strong acid for their concerted protonations of the $Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$ polyoxoanionic complexes for the concerted breakages of N—O and Mn—O bonds. The concerted breakages of N—O and Mn—O bonds occur relativistically. The magnetic field orients the $Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$ polyoxoanionic complexes with graphite and the magnetic field orchestrates the relativistic attack on many C=C aromatic pi $\pi$ bonds in the graphene by OH from the protonated aromatic $Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$ oxidative polyoxoanionic complexes with synchronized protonations-deprotonations of many Mn—O and N—O bonds for synchronized bond cleavages for synchronized $O^{2-}$ transfer to graphite. The magnetic field then orients such aromatic polyoxoanionic oxidants ($Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$) with the aromatic reductants (graphite and graphite oxide). The magnetic field thereby organizes the chemistry of the oxidative reductive reactions, but the chemisorptions on the graphene also influence the internal magnetism in the graphene, $KMnO_4$, $NaNO_3$, and $H_2SO_4$. As bonds are strained, distorted, disordered and ruptured during the oxidative reductive reactions the intermediates become more magnetic. With more internal magnetism, the self internal organization and synchronization are enhanced and organized simultaneous energy release is facilitated. The oriented reactants undergo accelerated electron transfer according to Dirac kinetics.

Accordingly, if a reacting solution of $KMnO_4$, $NaNO_2$, $H_2SO_4$ and graphite-graphene is exposed to an induced static magnetic field of about 0.01-1000 Tesla, then the rate of oxidation of the graphite to graphene oxide can be decelerated and/or accelerated with optional thermal modulation and a shift in dynamics to nitration of the graphene can be enhanced relative to such kinetics and dynamics in zero applied magnetic field. In short, the present embodiments provide magnetic induction and control of the chemical reactions for faster energy release and selective chemical functionalization of graphite and graphene. Compositions can include materials of preferred carbonaceous states that are highly crystalline graphite. Coal and amorphous carbons can also be applied and can also be oxidized and nitrated by the present methods. Other reagents such as perchlorates, borates, chromates, oxides, cobaltates, nickelates, vandates, and the like, are also applicable to provide further enhanced efficiency of chemical reaction.

Exemplary tests for compositions using systems, methods and devices for magnetic acceleration and shift in chemical reaction kinetics and dynamics can be generally described as graphite+oxygen+/− an induced magnetic field as a catalyst to provide and exothermic reaction (e.g., a flame or a flash). Specific tests were as follows:

1. Graphite oxidized by Hummers' Method using aqueous $KMnO_4$+$NaNO_3$+$H_2SO_4$ at 25° C. in open air (atmospheric at ambient temperatures) with and without external magnetic field.
2. Graphite oxidized in aqueous $KMnO_4$+$NaNO_3$+$H_2SO_4$ at 25° C. in argon with and without external magnetic field.
3. Graphite oxidized in aqueous $KMnO_4$+$NaNO_3$+$H_2SO_4$ at 25° C. in argon in external magnetic field of 0.5 Tesla.
4. Graphite oxidized in aqueous $KMnO_4$+$NaNO_3$+$H_2SO_4$ at 25° C. in air at 0.5 Tesla external magnetic field.
5. Graphite oxidized in aqueous $KMnO_4$+$NaNO_3$+$H_2SO_4$ at 75° C. in external magnetic field of 0.5 Tesla in air.
6. Graphite oxidized in aqueous $KMnO_4$+$NaNO_3$+$H_2SO_4$ at 75° C. in external magnetic field in open air.

The gaseous products from all these reactions were measured during all these reactions and oxidations of graphite. Considering the system of aqueous $KMnO_4$+$NaNO_3$+$H_2SO_4$+Graphite; it is useful for studying magnetic field effects on oxidative and reductive reactions.

Figure 1:
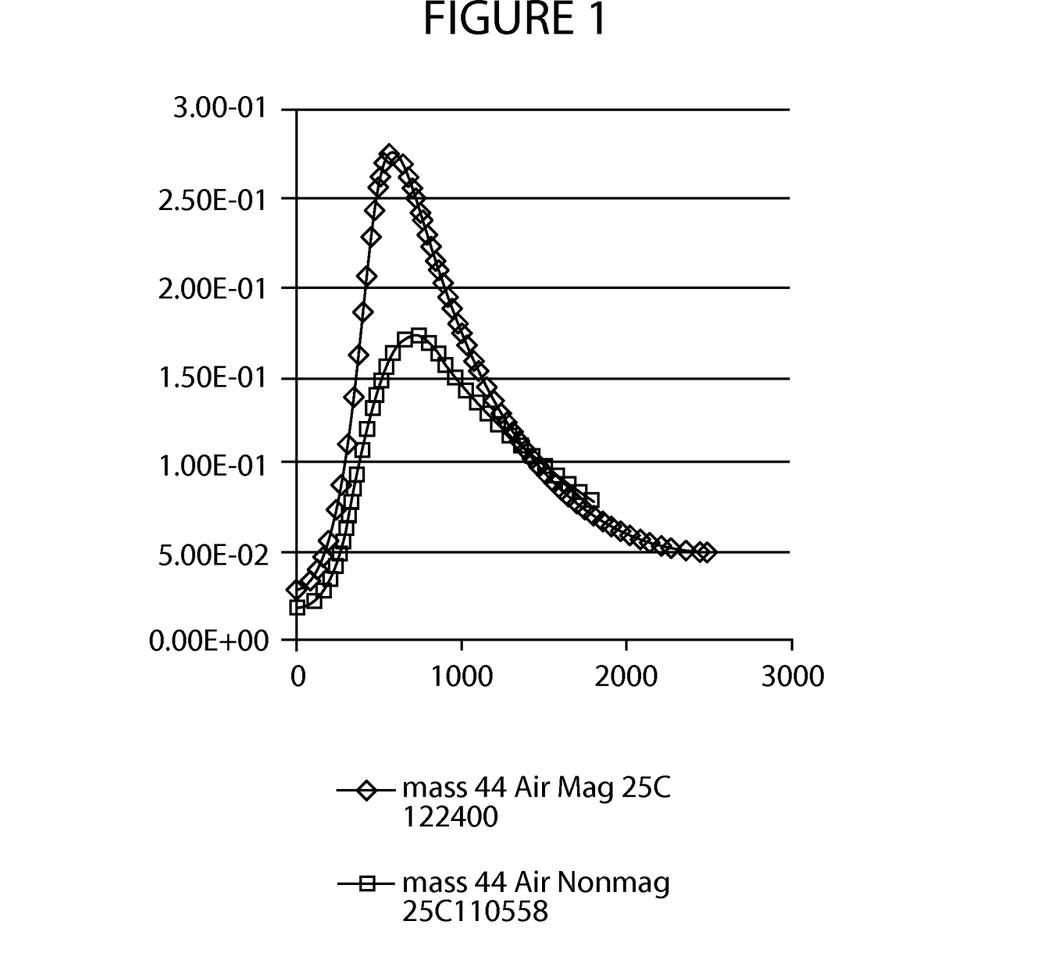
FIG. 1 comprises a Mass Spectra during Reaction of Graphite+$H_2SO_4$+$NaNO_3$+$KMnO_4$+Water in Air with No Applied and Applied Magnetic Field at 25° C.

Initial observations included an extraordinarily vigorous reaction which led to a generation of gas and flaming after 7-8 minutes of magnetic induction time during the oxidation of graphite by the Hummers' Method in the applied magnetic field of 0.5 Tesla at room temperature (about 25° C.) and under air exposure in a test tube open to the atmosphere. The mass analysis of the $CO_2$ gas released by such magnetic, aerobic oxidative reductive reactions is given in FIG. 1. But, when oxidative reductive reactions were allowed in the open air at ambient (approximately 25° Celsius) temperature with no external magnetic field, then no flaming and no flash occurred. The mass analysis for such oxidation without external magnetic field is also given in FIG. 1. From the mass analyses in FIG. 1, higher levels of $CO_2$ gas are produced and faster kinetics of graphite oxidation are observed for the oxidation of graphite in the open air with applied external magnetic field than without applied external magnetic field. The initial levels of $CO_2$ are higher for graphite aerobic oxidation in the external magnetic field than for graphite oxidation without the applied external magnetic field. The peaks in $CO_2$ formations in FIG. 1 both occurred at about 8 minutes (approximately 500 seconds as indicated on the x-axis of FIG. 1) after starting the oxidative reductive reactions and these peaks correspond to the same time of 7-8 minutes wherein the qualitatively, visually observed flaming and flash were noticed during the oxidation in open air under applied external magnetic field. The initial $CO_2$ levels in FIG. 1 for magnetic oxidation are greater than the initial $CO_2$ levels in FIG. 1 for non-applied external magnetic oxidation. The $CO_2$ is therefore formed with smaller induction time and more rapidly by applying external magnetic field to the oxidation under aerobic atmosphere. The faster $CO_2$ production in the applied external magnetic field for the aerobic oxidation may result due to the applied magnetic field orienting $p^+$ (aq) and $O_2$ (g) for multiple spin exchange with reactants to allow multiple electron transfers. Due to the limited amount of initial reactants for the aerobic oxidation without applied external magnetic field (in FIG. 1), there was a faster rise in $CO_2$ amount before the peak at 8 minutes and a faster fall in $CO_2$ level after the peak relative to the kinetics for the aerobic oxidation without applied external magnetic field (in FIG. 1). This may also result from the effects of the graphite becoming magnetic and the magnetic graphite repelling electron transfer to magnetic oxidants by Pauli Exclusion Principle under the external magnetic polarization for consequent slowing in reaction rate as the oxidative-reductive reaction progresses in the external magnetic field. Although the magnetically polarized oxidants and reductants resist electron transfer due to Pauli Exclusion Principle, the spin polarized reactants accelerate relative electronic motions between each other under Coulombic attractive fields. This internal magnetic acceleration of orbital magnetism has already been seen with external magnetic fields on graphene-graphite and orbital magnetism in graphene. A maximum initial reaction rate for the aerobic oxidation under applied magnetic field is about 0.000168 $S^{-1}$ whereas the maximum initial reaction rate for the nonmagnetic aerobic oxidation is about 0.000117 $S^{-1}$. (See Table I).

In Table I, the second derivative kinetics are also presented and compared for the graphitic aerobic oxidations with and without applied magnetic field. The second derivative kinetics revealed differences for the oxidation rates with and without applied magnetic field. The second derivative kinetics express the rates of change in rates of the reactions. It is observed that the applied magnetic field causes a hysteresis in the kinetics of aerobic oxidation. Such hysteresis suggests the possibility of reversible oxidative-reductive chemistry of graphite oxidation under suitable thermal and magnetic conditions. The reaction rate exhibited hysteresis of slowly increasing, then rapidly decreasing, then slightly increasing for the oxidation under applied magnetic field. For aerobic oxidation with no applied magnetic field, the second derivative kinetics revealed no such hysteretic rate changes. The hysteretic rate changes during graphite oxidation in applied magnetic field somewhat mimics the here suggested hysteresis of magnetics of $O_2$ uptake by hemoglobin. The cooperatively of $O_2$ absorption by hemoglobin protein is magnetic in nature. In the $O_2$ uptake by the Hummers' Method in this system, the applied magnetic field causes similar cooperative phenomena of $O_2$ absorption and reaction as the magnetic cooperatively of $O_2$ absorption by hemoglobin. These observed differences in graphite oxidation under weakly available magnetic fields suggest possibly even greater effects if more intense and stronger magnetic fields are applied during the graphite oxidation.

TABLE I

| TIME | Air (Mag) Derivatives | | Ar (NonMag) Derivatives | |
|---|---|---|---|---|
| | $1^{st}$ | $2^{nd}$ | $1^{st}$ | $2^{nd}$ |
| 0-246 sec | 0.000166 | | 0.000117 | |
| | | $2.60 \times 10^{-6}$ | | $1.33 \times 10^{-6}$ |
| 246-504 sec | 0.000799 | | 0.000438 | |
| | | $-1.92 \times 10^{-6}$ | | $-8.97 \times 10^{-7}$ |
| 504-1008 sec | -0.000181 | | -0.0000145 | |
| | | $7.22 \times 10^{-8}$ | | $-9.36 \times 10^{-8}$ |
| 1008-1800 sec | -0.000123 | | -0.000088 | |

Figure 2:
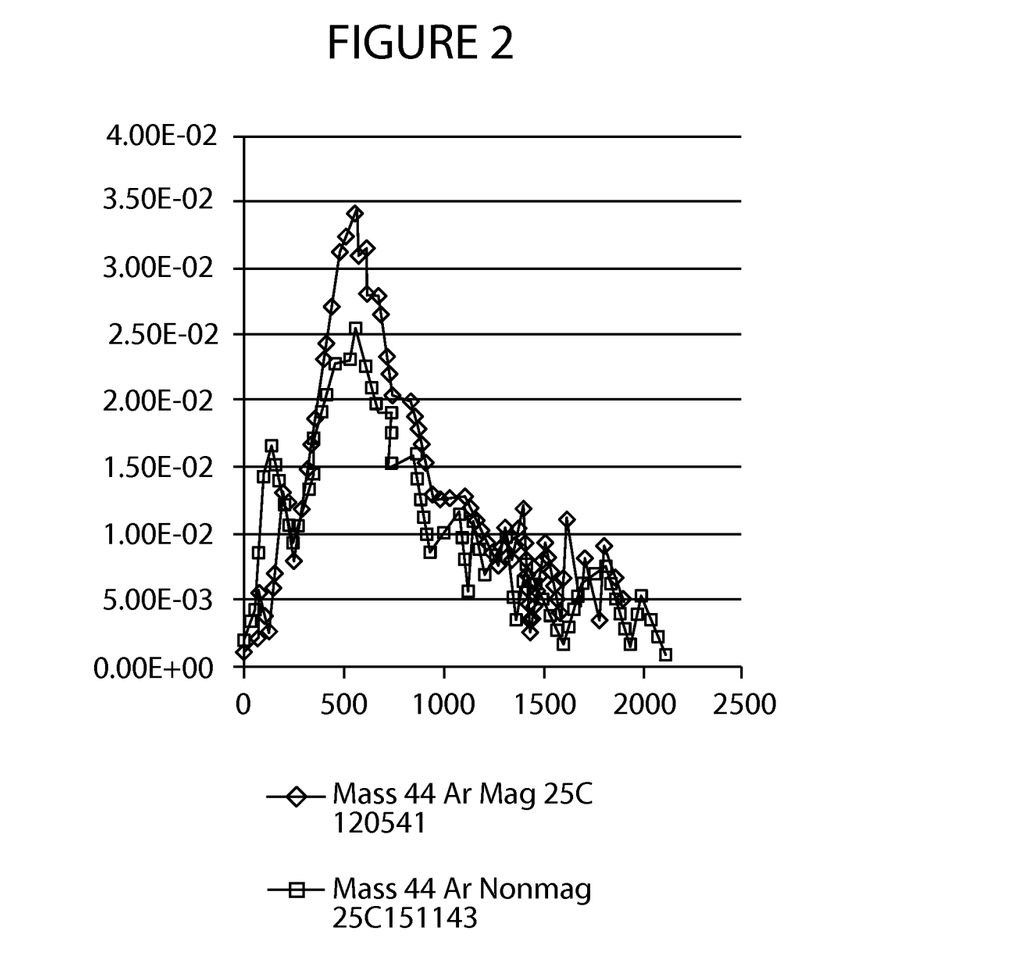
FIG. 2 comprises a Mass Spectra during Reaction of Graphite+$H_2SO_4$+$NaNO_3$+$KMnO_4$+Water in Ar with No Applied and Applied Magnetic Field at 25° C.

When air and oxygen were removed from the reactor (anaerobic) and an Argon (Ar) atmosphere was used, fewer flashes occurred during the oxidation of the graphite by Hummers' Method even under applied magnetic field. However, differences in $CO_2$ formation rates were observed between magnetic and non-magnetic graphite anaerobic oxidations at room temperature under Argon. The mass analyses of $CO_2$ produced by the graphite oxidation in Ar atmosphere with and without applied magnetic field are given in FIG. 2. FIG. 2 gives the $CO_2$ produced in time by graphite oxidation under Ar with no external magnetic field. FIG. 2 also gives the $CO_2$ produced in time by graphite oxidation in Argon with an applied external magnetic field. The inert Ar background gas diminished flashes and flaming during graphite oxidation. The Ar is less buoyant than air, affecting oxidation by suppressing the flashes during the oxidation. The Ar unlike the air exposed system is forced through the system by the pressure of the Ar tank. The anaerobic oxidation in magnetic field in Ar background was observed to occur at a faster rate than the anaerobic oxidation in Ar without applied external magnetic field. The maximum reaction rate in Ar under applied magnetic field was $0.0000916\ S^{-1}$. The maximum reaction rate without applied magnetic field was $0.0000461\ S^{-1}$. Also the magnetic field caused the reaction to shift the equilibrium more to $CO_2$. It appears that the faster reaction under Ar in the applied magnetic field relative to the slower reaction rate without applied magnetic field is a result of the $p^+$ (aq) of the reaction interacting with the magnetic reactants to exchange spin to allow reaction and external magnetic field coupling multi-spin exchange by $p^+$ (aq) for faster oxidative reductive kinetics.

Unlike the different changes in reaction rates for hysteresis after the peak in Air for the magnetic and nonmagnetic aerobic oxidations, the reaction rate changes after the peak in Ar are similar and hysteretic for both magnetic and nonmagnetic oxidations. But for the anaerobic system, the increasing hysteresis is greater for the magnetic oxidation ($5.00 \times 10^{-8}\ S^{-2}$) in comparison to the nonmagnetic graphitic oxidation ($2.98 \times 10^{-8}\ S^{-2}$). See Table II. The anaerobic oxidation in Ar therefore also manifest hysteresis in the kinetics in magnetic field as did the aerobic oxidation in Air in applied magnetic field. The anaerobic oxidative reductive reaction in Ar also appears to manifest hysteresis and cooperative effect intrinsically even without applied magnetic field. See Table II. This hysteresis for both external magnetic and nonmagnetic reactions in Ar supports the notion of intrinsic internal magnetism of graphite and various polyoxoanionic reactants and intermediates in this oxidative, reductive reaction. This difference in hysteretic behavior between aerobic (in $O_2$) and anaerobic (in Ar) graphite oxidations with no applied magnetic field may be understood as the aerobic conditions removes spin order from reactants by spin exchange of the reactants (graphite+ $Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$) with the incoming paramagnetic $O_2$ in air for the aerobic system. It appears that $O_2$ molecular spins exchange with $p^+$ (aq) and or the polyoxoanionic complexes and graphite intermediates of the strongly acidic media. $O_2$ (g) couples more strongly than $p^+$ (ag) to external magnetic field. Therefore the dynamics on aerobic $O_2$ (g) atmosphere are more sensitive to external magnetic field than dynamics in anaerobic atmosphere. The $O_2$ (g) in gas phase can couple better to the weak magnetic field than the $p^+$ (aq) in the water. The spin polarization and internal magnetism cause the cooperative hysteresis. So by removing spin polarization of reactants by incoming $O_2$, the hysteresis of the reaction is diminished. In $O_2$ (g), the spin polarization is removed for the non applied magnetic system. In Ar, the spin polarization is not removed for the non external magnetic system because of absence of $O_2$ (g). Therefore the lack of spin exchange in Ar atmosphere leads to hysteretic oxidation even without applied magnetic field and the greater unorganized spin exchange in the non-applied magnetic aerobic oxidation leads to non-hysteretic oxidation. The access of reactants to spin exchange with $O_2$ (g) for the oxidation without applied magnetic field thereby lacks hysteretic oxidation. Also by polarizing the $O_2$ by external magnetic field, the hysteresis arises as in Table I as polarize $O_2$ (g) spins are polarized with the spins of the reactants and intermediates and thereby the $O_2$ (g) spins cannot remove the spin of the reactants to facilitate oxidative reductive reactions. The peak time for maximum $CO_2$ levels occurs earlier for the anaerobic oxidation (6 minutes) than for the aerobic oxidation (8 minutes). Moreover, at room temperature (25° C.) the oxidation in Ar background gas (FIGS. 3 and 4) was slower relative to oxidation in air as background gas (FIGS. 3 and 4), both in applied field and without applied magnetic field.

TABLE II

| TIME | Ar (Mag) Derivatives | | Ar (NonMag) Derivatives | |
|---|---|---|---|---|
| | $1^{st}$ | $2^{nd}$ | $1^{st}$ | $2^{nd}$ |
| 0-246 sec | 0.000035 | | 0.000030 | |
| | | $2.33 \times 10^{-7}$ | | $6.54 \times 10^{-8}$ |
| 246-504 sec | 0.000092 | | 0.000046 | |
| | | $-2.65 \times 10^{-7}$ | | $-1.41 \times 10^{-7}$ |
| 504-1008 sec | -0.000042 | | -0.000025 | |
| | | $5.00 \times 10^{-8}$ | | $2.94 \times 10^{-8}$ |
| 1008-1800 sec | -0.0000026 | | -0.0000019 | |

Figure 3:
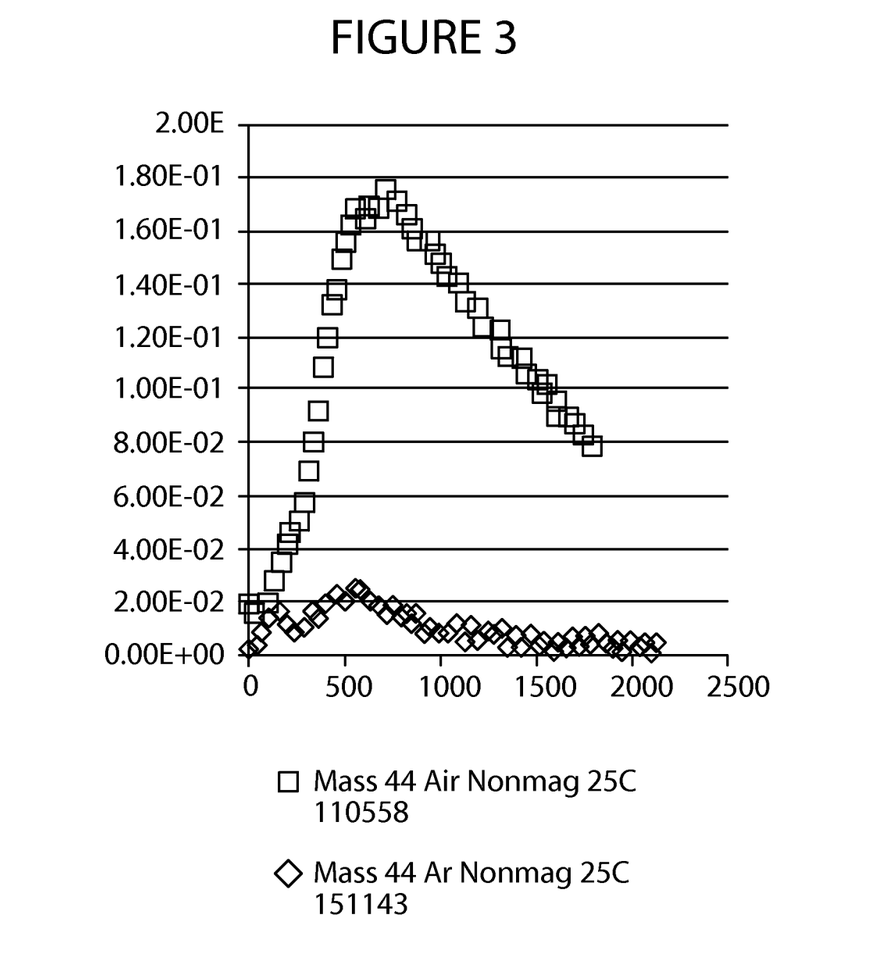
FIG. 3 comprises a Mass Spectra during Reaction of Graphite+$H_2SO_4$+$NaNO_3$+$KMnO_4$+Water in Air and Argon with No Applied Magnetic Field at 25° C.
Figure 4:
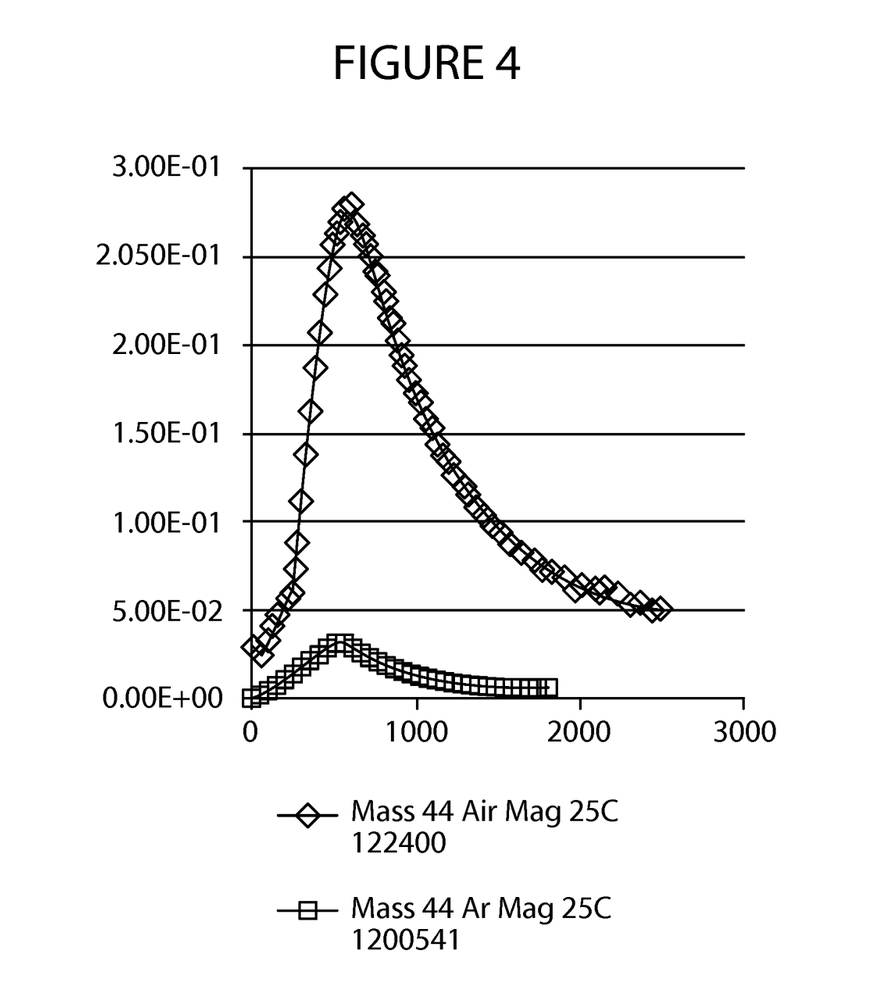
FIG. 4 comprises a Mass Spectra during Reaction of Graphite+$H_2SO_4$+$NaNO_3$+$KMnO_4$+Water in Air and Argon with Applied Magnetic Field at 25° C.

It is interesting to compare the oxidation in the open air with the oxidation in Ar. FIG. 3 compares the oxidation in air with the oxidation in Ar without an externally applied magnetic field at 25° C. The oxidation kinetics in Air are much faster than the oxidation kinetics in Ar without external magnetization. The faster oxidation kinetics in Air may be due to the paramagnetic nature of $O_2$ (g) and it may be due to the increased direct oxidation of the graphite by gaseous atmospheric $O_2$ (g) as the mixture heats from its exothermicity. The paramagnetic $O_2$ (g) molecule affects the internal magnetism in the reaction of graphite with $H_2SO_4$, $KMnO_4$ and $NaNO_3$ as the $O_2$ exchanges spin momentum with the intermediates as the oxidation proceeds. Such exchange of spin momentum allows the increased acid oxidation as it allows continued electron transfer between the increasingly magnetic graphitic reductants and magnetic oxidants ($Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$) by removing spin polarization and alleviating frustrated e~ transfer by Pauli Exclusion Principle so that the multi electron transfers become allowed and occur by $O_2$ (g) buffering the necessary spin momentum thereby allowing multi-electron transfer to occur. It is interesting to wonder why for the anaerobic system, why the $p^+$ (aq) (aqueous protons) do not allow the same spin exchange and coupling to external magnetic field as the $O_2$ (g). The reason for the weaker coupling of the $p^+$ (aq) relative to $O_2$ (g) is the stronger coulombic interactions of $p^+$ (aq) spins relative to the freer molecular moment of $O_2$ (g) (due to $p^+$ (aq) being in liquid and $O_2$ (g) being in gaseous states) and the need for much stronger magnetic field to coerce $p^+$ (aq) spins to affect the $p^+$ (aq) modulation of oxidative reductive kinetics. Because larger magnetic alterations are observed with $O_2$ (g) moments relative to $p^+$ (aq) moments, greater rates and rate changes are observed for aerobic oxidation relative to anaerobic oxidation. Similar effects are observed in comparing the oxidative reductive kinetics in Ar and Air with applied magnetic field. See FIG. 4. Moreover in the applied magnetic field, less initial time for organization of the reactants is observed as faster onset of oxidation in magnetic field with the Ar atmosphere without a drop and delay as the system needs less time to organize in external magnetic field relative to more time to organize without the applied magnetic field. But in FIG. 3, the anaerobic oxidation without an applied magnetic field led to a drop in rates as without the external magnetic field, the system needed more time to internally self organize.

Therefore by changing the external magnetic field and changing the paramagnetism of the gaseous atmosphere surrounding the oxidative reductive reaction, it is determined that the reaction becomes magnetic; the internal magnetism slows and modulates the reaction hysteretically; the concentration of radical intermediates of the reaction can build-up with explosive release upon external spin exchange; paramagnetic $O_2$ (g) of the gas phase gives spin exchange for promoting and sustaining electron transfer and oxidative reductive reactions; external magnetic field can polarize $p^+$ (aq) and $O_2$ (g) to hinder needed spin exchange with reactants to build up radicals and reductants to organize and orchestrate sudden oxidation reduction for sudden power release.

Figure 5:
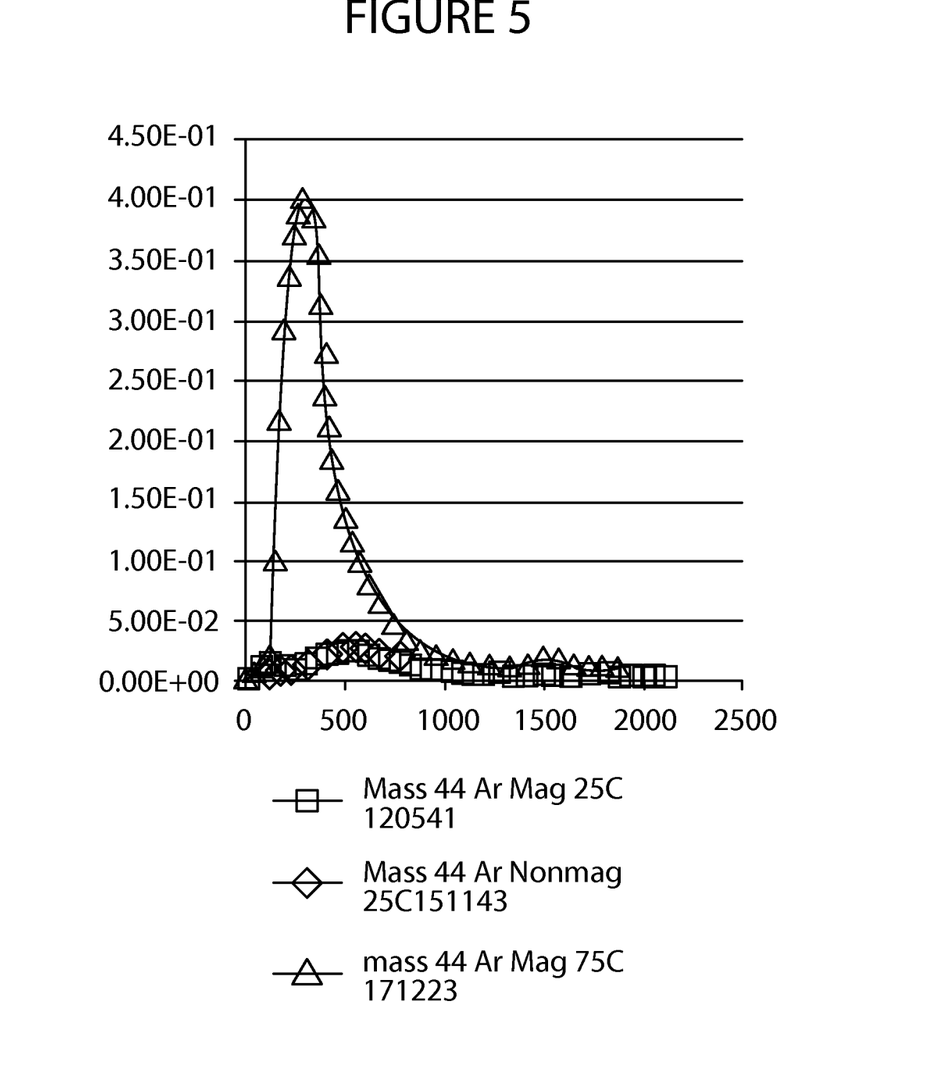
FIG. 5 comprises a Mass Spectra during Reaction of Graphite+$H_2SO_4$+$NaNO_3$+$KMnO_4$+Water in Argon with 0.5 Tesla Magnetic Field at 75° C. and 25° C.
Figure 6:
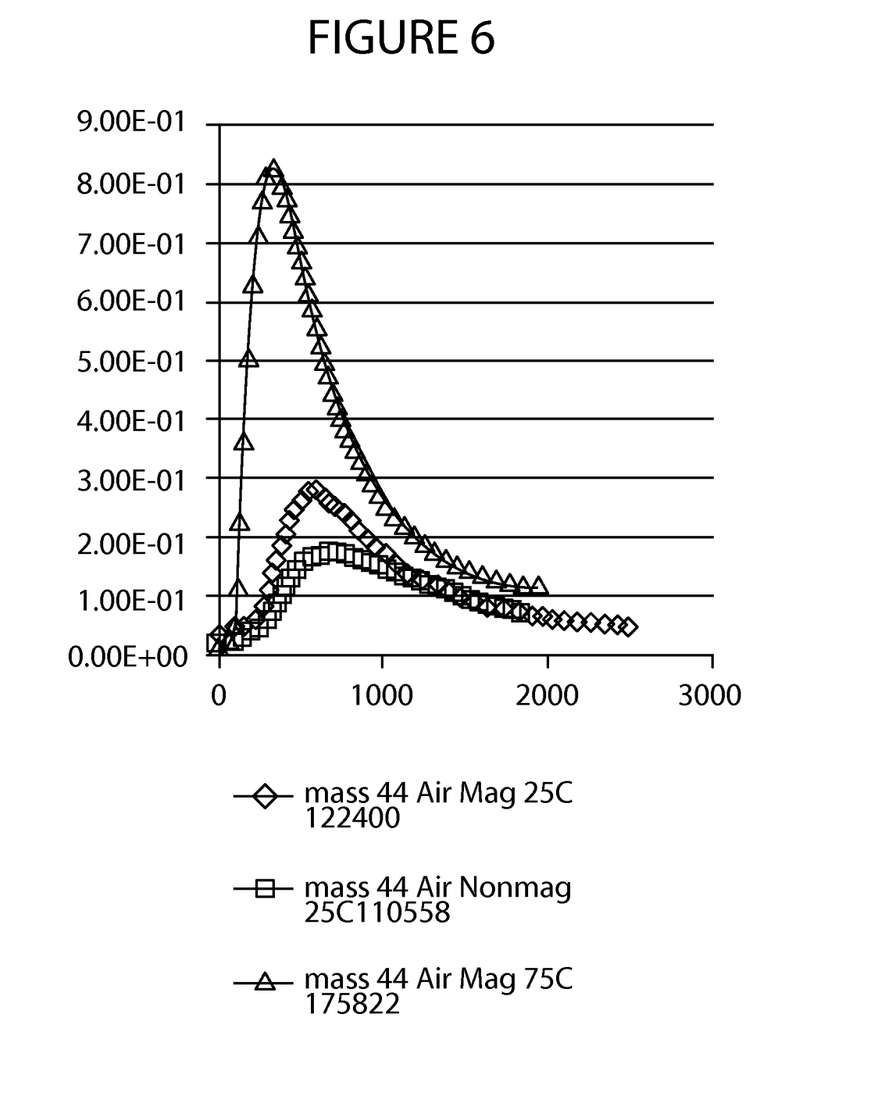
FIG. 6 comprises a Mass Spectra during Reaction of Graphite+$H_2SO_4$+$NaNO_3$+$KMnO_4$+Water in Air with 0.5 Tesla Magnetic Field at 75° C. and 25° C.
Figure 7:
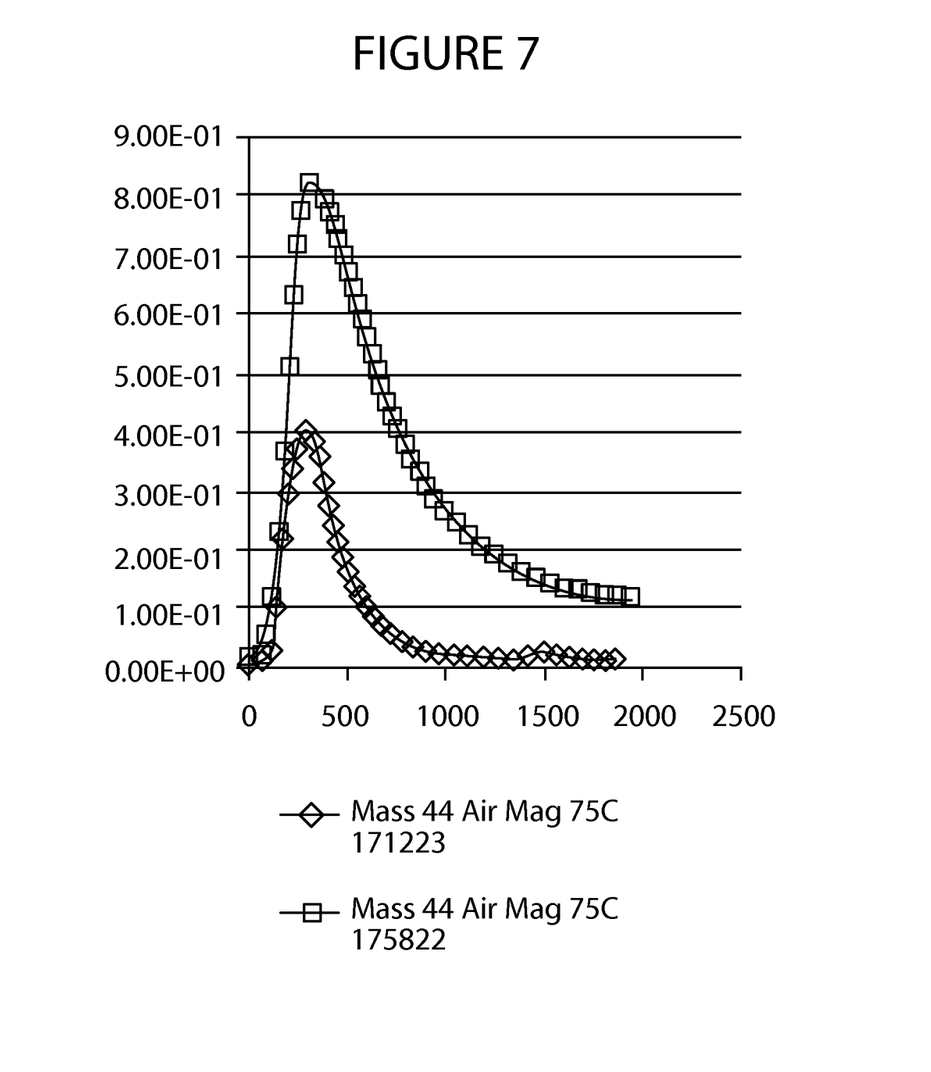
FIG. 7 comprises a Mass Spectra during Reaction of Graphite+$H_2SO_4$$NaNO_3$+$KMnO_4$+Water in Air and Argon with Applied Magnetic Field at 75° C.

In order to further study the oxidation and distinguish magnetic and thermal effects, the Hummers' reactions were done at a higher temperature of 75° C. in the open air and under Ar atmospheres. In the open air at 75° C. (experiment 6), we observed even larger carbon dioxide ($CO_2$) release and faster magnetized, oxidative reductive kinetics than at 25° C. in the 0.5 Tesla magnetic field (FIG. 5 for Ar, anaerobic graphite oxidation) (FIG. 6 for Air aerobic graphite oxidation). The magnetic graphite oxidative reductive rate in Ar (anaerobic) at 75° C. was 0.00128 $S^{-1}$. The magnetic graphite oxidative reductive rate in Air (aerobic) at 75° C. was 0.00275 $S^{-1}$. See Table III. The magnetic, oxidative-reductive kinetics of graphite was faster in the Air relative to the rate in Ar at 75° C. (See FIG. 7). And at 25° C., the magnetic oxidative kinetics of graphite in Air was faster than the kinetics in Ar background. The faster oxidation in air under magnetic field relative to Ar atmosphere at higher temperature of 75° C. results from from the greater magnetic disorder of reactants in air relative to Ar, from more spin exchange between reactants and $O_2$ (g) in air, from the possibility of faster $O_2$ (aq) formation in Air and under external magnetic field, and from higher temperatures increasing the possibility of direct aerobic oxidation by $O_2$ (g) from the Air atmosphere. Also higher temperatures cause more buoyancy of argon. Moreover, when comparing the magnetic graphite oxidation at 75° C. and at 25° C. in the open air (see FIG. 6), the aerobic, magnetized graphite oxidation rate was faster at 75° C. in spite of the increase temperature and the expected lower solubility of $O_2$ (g) at higher temperatures by Henry's Law. Higher temperatures tend to disorganize magnetic moments, so $O_2$ (g) should be less absorbed and more disorganized at higher temperatures. But $O_2$ (g) is paramagnetic and quite remarkably, it was observed that the external magnetic field and developing internal ferromagnetism opposed Henry's Law and the thermal effect of lowering $O_2$ (g) solubility at higher temperatures by magnetically increasing the paramagnetic $O_2$ (g) solubility and concentration in aqueous media in spite of the higher temperature at 75° C. for faster oxidation and greater $CO_2$ production at 75° C. relative to 25° C. and organization of the graphite oxidation in the water solution. The greater effect of magnetism relative to Henry's Law follows from the development of stronger ferromagnetism in graphite oxide and defective graphite relative to the initial graphite. Such greater ferromagnetism of the graphite intermediates and graphene oxide present much stronger magnetic attraction to paramagnetic oxygen molecules and $Mn_xO_y^{-z}$—$N_aO_b^{-c}$, $Mn_xO_y^{-z}$—$S_aO_b^{-c}$ and $Mn_xO_y^{-z}$—$Mn_aO_b^{-c}$ relative to the weaker van der Waals and London forces classically that cause the Henry's Law. The ferromagnetism of graphite oxide pulls paramagnetic $O_2$ (g) to the ferromagnetic graphite oxide. In this way, the Henry's Law is opposed so faster oxidation occurs from $O_2$ (g) in spite of higher temperatures and Henry's Law.

TABLE III

| TIME | Air (Mag) Derivatives | | Ar (Mag) Derivatives | |
|---|---|---|---|---|
| | $1^{st}$ | $2^{nd}$ | $1^{st}$ | $2^{nd}$ |
| 0-246 sec | 0.00207 | | 0.00128 | |
| | | $4.04 \times 10^{-6}$ | | $-1.71 \times 10^{-6}$ |
| 246-504 sec | 0.00275 | | 0.000993 | |
| | | $-7.77 \times 10^{-6}$ | | $-3.81 \times 10{-6}$ |
| 504-1008 sec | -0.000980 | | -0.000737 | |
| | | $7.52 \times 10^{-7}$ | | $-2.27 \times 10{-8}$ |
| 1008-1800 sec | -0.000238 | | -0.000022 | |

Although these magnetic reactants are strongly polarized and attract each other for compression, the Pauli Exclusion Principle will not allow the electron transfer until some spin exchange occurs. After spin exchange occurs then the consequent unpolarization of spins can rapidly, explosively transfer with sudden power release as products form. Just as was the case at 25° C., the magnetic oxidation in the open air results in a cooperative hysteresis such that the rate of change of the reaction rate increases then decrease then increase again hysteretically; the magnetic oxidation in air at 75° C. also manifest such cooperative hysteresis kinetics.

See Tables I and III. The hysteresis in kinetics was also observed in anaerobic oxidation at 25° C. in Ar for the applied and non-applied magnetic field as was explained by the internal magnetism in the reaction intermediates of the Hummers' method. See Table II. But at 75° C. such hysteresis in kinetics of anaerobic oxidation was not observed in Ar atmosphere under applied magnetic field. See Table III. The explanation for hysteresis at 25° C. for magnetic anaerobic oxidation in Ar but the non-hysteresis at 75° C. for magnetic anaerobic oxidation in Ar is that the higher temperature disrupts the internal spin polarization and magnetic order that causes the hysteresis of the reaction rate in the anaerobic system in Ar at 25° C. Without any $O_2$ (g) in the anaerobic system, no polarized $O_2$ (g) is present to spin reorganize reactants (graphite, $KMnO_4$, $O_2$ (g) $NaNO_3$ and $H_2SO_4$) as the temperature disrupts the spin polarization and demolishes hysteresis. See Table III.

The diamagnetic $CO_2$ is also pushed away from the oxidative reductive reactions under magnetization to further drive the equilibrium toward the right, producing more $CO_2$ and burning more graphite. The effect of less Henry's Law to magnetically uptake of $CO_2$ (g) is revealed in the slower decrease in reaction rate after peak in the Air, relative to the faster decrease in reaction rate in Ar for a hysteretic cooperative effect observed in the aerobic oxidation under magnetic field. This is explicit evidence that $O_2$ (g) is being absorbed and interacting via spin exchange with reactants and is contributing to oxidation of graphite by the regeneration of $MnO_4^-$ (aq) and $NO_3^-$ (aq) from MnO (aq) and $NO_2$ (g) for a breathing cooperative aerobic oxidation of graphite. The higher $O_2$ (g) concentration and higher temperatures with the magnetic organization and synchronization of the reactants caused the explosive oxidation of the graphite in the air under the applied magnetic field.

It can also be considered that at higher temperatures, $CO_2$ (g) solubility is less. So $CO_2$ (g) is pushed diamagnetically out of the reactor. Ar (g) is also heavier than $O_2$ (g), so it smothers the reaction. Also, by Le Chatlier Principle, Ar (g) is pushing $CO_2$ (g) out of the reactor and shifting the equilibrium toward more $CO_2$ (g) and more oxidation of graphite. It thus appears that the effect of background gas was due to $O_2$ (g) reoxidizing reduced Mn species and the resulting oxidized Mn species further oxidizing more graphite. The magnetic field appeared to accelerate this recycle of Mn centers: $Mn_xO_y^{-z} \leftrightarrow MnO_2 \leftrightarrow Mn_xO_y^{-z}$. It was also observed that the magnetic field enhanced the role of $N_2O_6^-$ in the oxidation of graphite. These observations confirm magnetic effects, temperature effects, concentration effects and paramagnetism and ferromagnetism to organize the reactants of $O_2$, $N_xO_y$, $Mn_xO_y$, $S_xO_y$, and ferromagnetic graphite.

While the methods and apparatus have been described in conjunction with specific embodiments, it is evident that many alternatives, modifications, and variations will be apparent to those skilled in the art in light of the foregoing description.

We claim:

1. A method of promoting a chemical reaction, the method comprising the steps of:
    admixing at least two chemical precursors, at least one of the chemical precursors including a carbon compound selected from the group consisting of graphite, graphene, coal, diamond, cellulose, proteins, and various combinations thereof, wherein at least one chemical precursor or its intermediate is magnetic after application of a magnetic field; and
    applying a magnetic field to the chemical precursors to effect a chemical reaction of the at least two of the chemical precursors, wherein the chemical reaction has a reaction rate wherein the magnetic field is effective to increase the reaction rate at least 14 percent over a chemical reaction between the same reactants at the same pressure and temperature after the same time period of reaction where the reaction mixture is not exposed to the magnetic field.

2. The method of claim 1, wherein an initial reaction temperature is in the range of about 25° to 1000° Celsius.

3. The method of claim 2, wherein an initial reaction occurs at a temperature in a range of about 25° to about 75° Celsius.

4. The method of claim 1, wherein during the application of the magnetic field, the carbon of the precursor or its intermediate undergoes a dynamic transition to become magnetic.

5. The method of claim 1, wherein the magnetic field is in the range of up to about 50 Tesla (T).

6. The method of claim 5, wherein the magnetic field is about 0.5 T.

7. The method of claim 1, wherein the magnetic field is constant.

8. The method of claim 1, wherein the magnetic field varies over time in the range of about 0 to 500 seconds and space in the range of about 0 to 1 micron.

9. The method of claim 1, wherein the chemical reaction occurs in an oxygenated environment in the range of about 1 to 80 percent.

10. The method of claim 1, wherein the chemical reaction occurs in a pressure range of about $10^{-9}$ to $10^8$ atm.

11. The method of claim 1, wherein the method further comprises admixing a magnetic alloy catalyst with the chemical precursors.

12. The method of claim 11, wherein the magnetic alloy catalyst is selected from the group consisting of iron, cobalt, neodymium, nickel and combinations thereof, in the range of about 1 to 40 percent weight.

13. The method of claim 1, wherein at least one precursor is graphite and the chemical reaction includes the oxidation of graphite to graphene oxide in the presence of an oxidizer.

14. The method of claim 1, wherein the chemical reaction includes the nitration of graphene.

15. The method of claim 1, wherein at least one precursor is coal and the chemical reaction includes the combustion of coal.

16. The method of claim 1, wherein the chemical reaction functionalizes graphene.

17. The method of claim 1, wherein the method further comprises including the chemical reaction reagents selected from the group consisting of perchlorates, borates, chromates, oxides, cobaltates, nickelates, vandates, and combinations thereof.

18. The method of claim 1, wherein the chemical reaction occurs in an anaerobic environment.

19. The method of claim 18, wherein the anaerobic environment includes Argon gas.

20. The method of claim 1, wherein a precursor is para-magnetic or ferro-magnetic.

21. A method of controlling a reaction rate of a chemical reaction, the method comprising:
    mixing at least two chemical reactants, at least one chemical reactant including a compound which includes carbon and at least one reactant being an oxidizer selected from the group consisting of sulfuric acid, $NaNO_3$, $KMnO_4$ and mixtures thereof to provide a reaction mixture, at least one chemical reactant being magnetic after application of a magnetic field; and applying the magnetic field to the reaction mixture, the magnetic field being applied to effect a control of the rate of a chemical reaction between the reactants in the reaction mixture, the magnetic field being effective to change the reaction rate over a chemical reaction between the same reactants at the same pressure and temperature where the reaction mixture is not exposed to the magnetic field.

22. The method of claim 21, wherein the reaction mixture has an initial reaction temperature in the range of about 25° to 1000° Celsius.

23. The method of claim 22, wherein the initial reaction temperature is in a range of about 25° to about 75° Celsius.

24. The method of claim 21, wherein at least one chemical reactant is selected from the group consisting of graphite, graphene, coal, diamond, cellulose, proteins, and combinations thereof.

25. The method of claim 21 wherein the magnetic field is in the range of from about 0.5 to about 50 Tesla.

26. The method of claim 23 wherein the magnetic field is in the range of from about 0.5 to about 50 Tesla.

27. The method of claim 26 wherein the reaction rate is increased with the reaction being exposed to the magnetic field.

28. The method of claim 26 wherein the reaction rate is decreased with the reaction being exposed to the magnetic field.

29. An apparatus configured to effect a chemical reaction during which the reaction is exposed to a magnetic field, the apparatus comprising:

a chamber configured to blend chemical reactants and react the chemical reactants, at least one first chemical reactant selected from the group consisting of graphite, graphene, coal, diamond, cellulose, proteins, and combinations thereof and at least one second reactant selected from the group consisting of sulfuric acid, $NaNO_3$, $KMnO_4$ and mixtures thereof; and a magnetic field source device effective to expose the first and second reactants to a magnetic field magnetic field within the chamber, the magnetic field source device effective for providing a magnetic field in the range of from about 0.5 to about 50 Tesla and also to effect an increase a reaction rate of the chemical reactants by at least 14 percent as compared to a chemical reaction between the same reactants at the same pressure and temperature after the same time period of reaction where the reaction mixture is not exposed to the magnetic field.

30. The apparatus of claim 29, wherein the chamber is effective for containing reactions which have a temperature in the range of about 25° to 1000° Celsius.

31. A method of increasing a reaction rate of a chemical reaction, the method comprising:

mixing at least two chemical reactants at least one chemical reactant including a compound which is selected from the group consisting of graphite, graphene, coal, diamond, cellulose, proteins, and combinations thereof and at least one reactant being an oxidizer to provide a reaction mixture, at least one chemical reactant being magnetic after application of a magnetic field; and applying a magnetic field to the reaction mixture, the magnetic field being applied to effect an increase of the rate of a chemical reaction which oxidizes or functionalizes the carbon compound, the magnetic field being effective to increase the reaction rate by at least 14 percent as compared to a chemical reaction between the same reactants at the same pressure and temperature after the same time period of reaction where the reaction mixture is not exposed to the magnetic field.

32. The method of claim 1, wherein the chemical reaction functionalizes the carbon compound.

33. The method of claim 21 wherein the carbon compound is selected from the group consisting of graphite, graphene, coal, diamond, cellulose, proteins, and combinations thereof, the chemical reaction functionalized the carbon compound and the reaction rate is increased by at least 14 percent over a chemical reaction between the same reactants at the same pressure and temperature after the same time period of reaction where the reaction mixture is not exposed to the magnetic field.

34. The method of claim 31, wherein the chemical reaction functionalizes the carbon compound.

* * * * *